Nov. 13, 1945.  A. C. PETERSON ET AL  2,389,077

SEWAGE SLUDGE, SCREENINGS AND GARBAGE COMBUSTION APPARATUS

Filed Feb. 19, 1941  3 Sheets-Sheet 1

Inventors
Adolph C. Peterson
Clifford R. Raiter

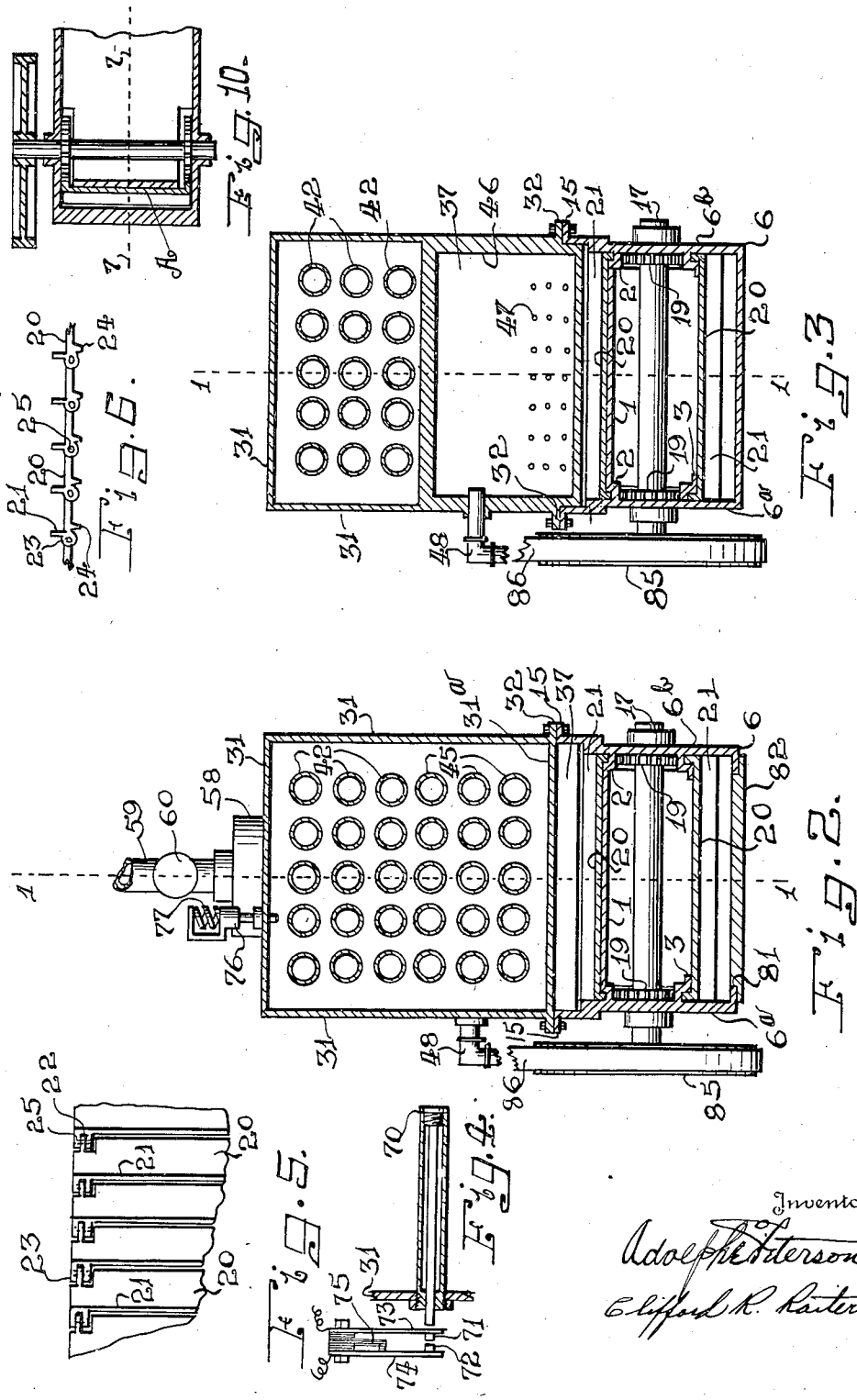

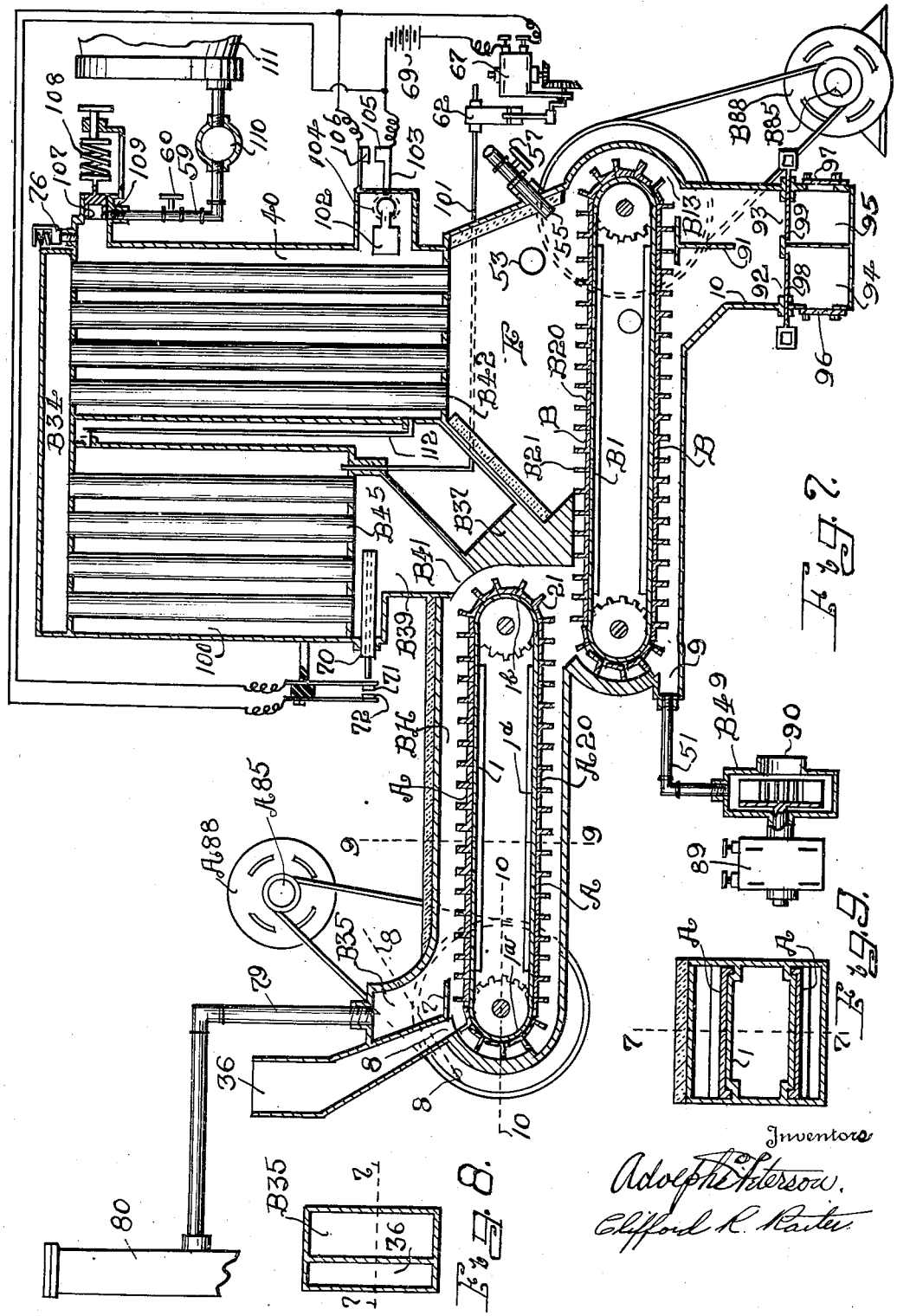

Patented Nov. 13, 1945

2,389,077

UNITED STATES PATENT OFFICE 2,389,077

SEWAGE SLUDGE, SCREENINGS, AND GARBAGE COMBUSTION APPARATUS

Adolphe C. Peterson, Minneapolis, and Clifford R. Raiter, St. Paul, Minn.

Application February 19, 1941, Serial No. 379,730

2 Claims. (Cl. 110—8)

Our invention relates to apparatus and processes for the combustion of sludges such as sewage sludge, screenings or garbage, and is accordingly called sewage sludge, screenings and garbage combustion apparatus and process.

The chief objects of our invention are to provide a method and an apparatus for the combustion of such sludge material or screenings as are produced in a sewage disposal plant, or of garbage such as collected in municipal garbage collection, which method and means shall be simple in construction, simple in operation, effective in operation, and relatively economical in operation and use. An object is to provide an improved process especially for sludge combustion which process comprises chiefly an effective continuous feeding and combustion and a continuous drying process inherent in the method and means for the combustion. An object is to provide a process for such combustion and a means for carrying out such process which shall provide a system whereby there is an economical and effective use of the heat of the combustion process for the vaporizing of the volatile content in substantial degree with elimination thereof and for the substantial drying of the sludge in preparation for the combustion, so that in the ultimate combustion there is a rapid and very thorough and effective combustion of all the solids of the sludge material and the combustible vapors of the sludge material fed to the means. An object is to provide in conjunction with such effective means and method for the combustion of such sludge material (or of garbage material), effective and efficient steam generation means so that in such combustion and drying of such sludge there is the most effective use of the sludge or garbage material as combustion fuel for such steam generation for auxiliary power generation or other use, with the most effective heat utilization in such steam generation. Accordingly an object is to provide a means and method for the combustion and use of sludge material of such plants as sewage plants, or of garbage collection, which means shall result in large recovery of power from such combustion in proportion to the fuel values of such material as such material is ordinarily considered, and with the further result that accordingly such disposal of such material with such means and method is not an expensive but is rather an effective power production sludge disposition or garbage disposition means with recovery of a power of a value which is proportionately greater in comparison with existing means such as there may be, and which would contribute therefore to the making of such disposal plants as a profit plant or a non-cost plant rather than a cost absorbing plant.

The principal devices and combinations of devices comprising our invention are as hereinafter described and as defined in the claims. In the accompanying drawings which illustrate our invention in several different forms, like characters refer to like parts throughout the views, in so far as possible. Referring to the drawings:

Figure 2 is a vertical section on a plane at right angles to that of Figure 1 and on the line 2—2 of Figure 1, transversely of the device.

Figure 3 is a vertical section on a plane at right angles to that of Fig. 1, and is transversely of the device and on the line 3—3 of Fig. 1.

Figure 4 is a small broken away section through the side wall of the generator casing to show in detail the thermostatic control element which is illustrated at 70 in Fig. 1.

Figure 5 is a broken away view in plan of a small section of the chain or belt conveyor at one side thereof, to show the flexible linking means thereof in detail.

Figure 6 is a small section of the belt conveyor, broken away and enlarged to show in detail a side view of the linking means.

Figure 1:
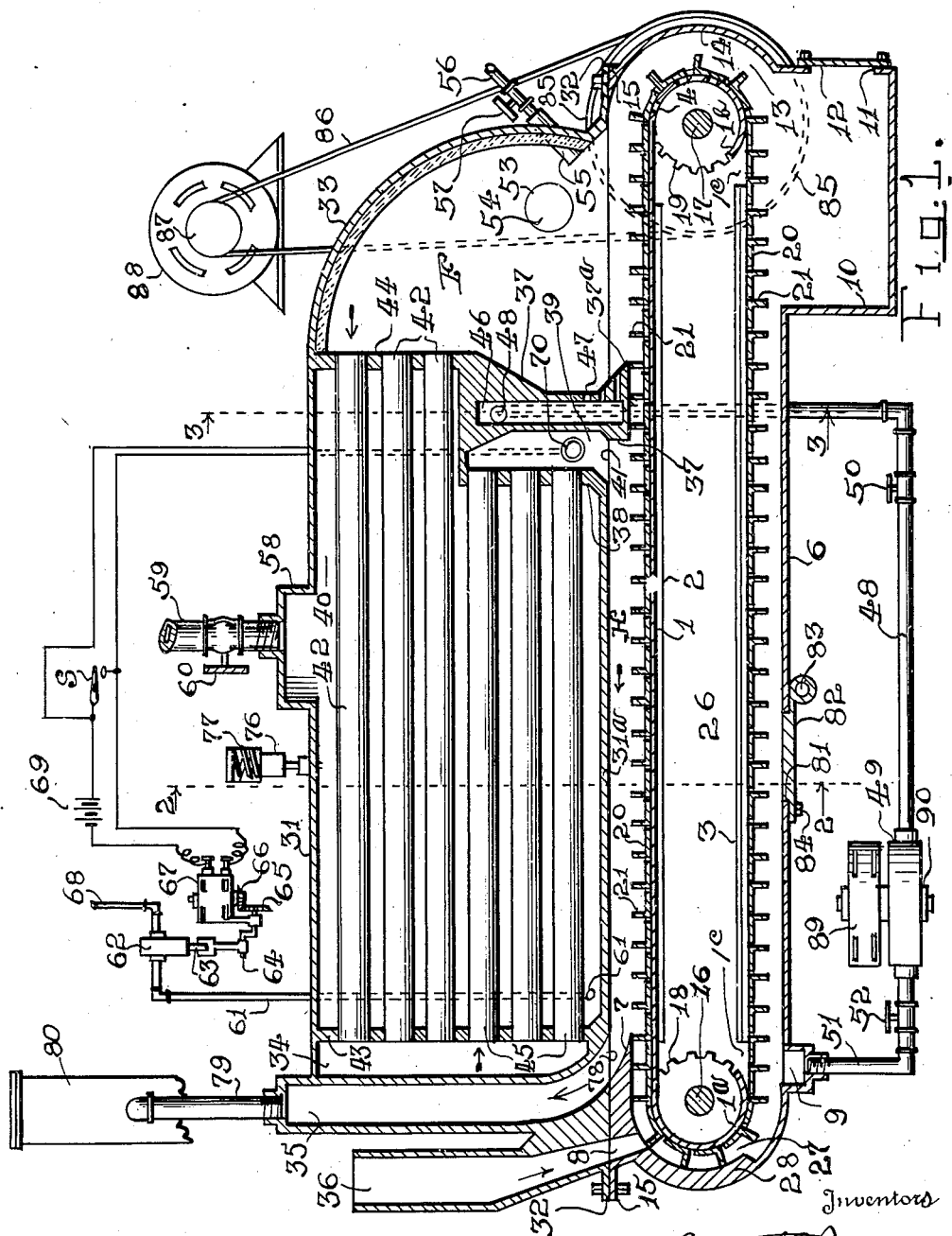
Figure 1 is a view chiefly in vertical section through the principal elements of our device, and is on a vertical plane passing longitudinally and centrally through the device, and is on the lines 1—1 of Figures 2 and 3.

Figures 7, 8, 9, 10 show a modified form of the device, and of these figures Figure 7 is a vertical section through the principal elements; Figure 8 is a transverse section on line 8—8 of Figure 7 at an angle to horizontal; Fig. 9 is a transverse vertical section at right angles to Figure 7 on line 9—9 of Fig. 7; and Fig. 10 is a partial section on line 10—10 of Fig. 7, on a horizontal plane. Fig. 7 is on lines 7—7 of Figs. 8, 9, 10.

Referring first to the Figures 1 to 6 both inclusive, which show the first form described, and what is in some installations a preferred form, the numeral 1 indicates generally a so-called conveyor table or platform which is a horizontal elongated metallic continuous and flat sheet metal member and has formed at its ends and integrally therewith curved nearly completely round parts 1a and 1b, each part 1a and 1b being formed on a circle having a radius of say at least six inches or more, but so that there is an open space 1c between the upturned end of part 1a or 1b, and the portion of table 1 above it, as shown in Figure 1. The parts 1a and 1b form substantially a semi-circular shape at each end of conveyor table 1. The conveyor table 1 has along its long sides, just below the side edges thereof the horizontal channel parts 2, at each side, and by the latter the table is welded to or otherwise attached to the portions 6a and 6b of the conveyor casing, hereafter described, and is thus supported by the portions 6a and 6b. There are also horizontal channel parts 3 each being below one channel part 2, each being approximately as long as channel parts 2, and each being welded to or otherwise attached to the interior side of the portions 6a and 6b of the conveyor casing. The conveyor table 1 is relatively much longer than it is wide, the length and width depending largely on the contemplated capacity of the combustion device as a whole. The part 1b has a number of small apertures 4 which are air apertures, for the purpose of permitting some small volume of air to pass through for the cooling hereafter described.

The conveyor table 1, by the portions 6a and 6b is supported within a conveyor casing 6, the latter being also formed of metal such as steel or steel alloy, and having in general throughout the major portion of its length a form such that it encloses on the sides and bottom the space within which is the conveyor table 1, with however the major spaces between its bottom and the conveyor table as hereafter described, principally for the movement of the conveyor or belt chain hereafter described and the movement of air beneath said chain conveyor. The conveyor casing at the left hand end of Figure 1, is curved around the part 1a with however a space between it sufficient for the passage of the conveyor chain as hereafter described. There is formed with the left hand end of the conveyor casing a shoe shaped part 7 which extends transversely across the space just above the conveyor table 1 near the left hand end thereof, but with just enough space below it between it and the top of the conveyor table, for the passage of the conveyor chain slabs, as hereafter described, the front or right edge or end of shoe 7 being pointed in vertical section, as shown in Fig. 1, and being of the same section throughout the length of the shoe 7 transversely of the space occupied by it. There is formed immediately leftwardly of shoe 7, in Fig. 1, a sludge port or channel 8 which is transversely of casing 6, approximately as long as casing 6 is wide (that is transversely of the chain conveyor hereafter described), and which is transversely of the sludge port 8 say two or three inches or a few inches wide, or so wide that there will be a free and sufficient flow of the sludge material as hereafter described.

The conveyor casing 6 has formed in its bottom side, that is below conveyor table 1, and approximately just below part 1a, an air port or channel 9 which also extends transversely of the conveyor casing approximately from part 6a to part 6b, and is in section sufficiently large to permit of the free movement of the air received as hereafter described. The air port or channel 9 discharges by a somewhat narrowed elongated opening to the space beneath conveyor table 1, or immediately below the left hand end of the conveyor chain hereafter described.

The right hand end of the conveyor casing 6, as shown in Fig. 1, on its bottom side or lower side, is open to an ash pit formed by the pit casing 10, the latter being formed integrally with the lower side of the conveyor casing or attached thereto in the position shown. The pit casing 10 is open at its top to the space immediately below conveyor table 1 at the latter's right hand end, and is otherwise closed to atmosphere, so that air may not enter or leave by way of the ash pit, but a port or door opening 11 is provided in the side wall of the pit casing 10, normally closed by the bolted cover 12, access being thereby provided to the pit casing for removal of ashes when and at such intervals as that may be necessary. It is contemplated that this pit casing 10 will be sufficiently deep and capacious so that it will adequately provide for the ashes deposited therein in operation, or that some means such as that shown in connection with the other form hereafter described, may be provided so that there may be ash removal, without interference with the normal draft and air circulation in the operation of the device.

The right hand end of the conveyor casing has an upwardly curving space 13 between the part 1b of the conveyor table and the curved wall 14 of the conveyor casing at the right hand end, Fig. 1, this space 13 being a few inches thicker in section than the space required for movement of the conveyor chain as hereafter described, and as long transversely of the conveyor casing 6 as the latter is wide, or approximately so, thus providing sufficient space for passage of air as hereafter described around the right hand end of the chain conveyor, hereafter mentioned.

The conveyor casing 6, at a level just several inches above the bottom face of the shoe 7 has a flange 15 formed all around the outside top edge of the conveyor casing, such that this flange will provide an adequate mounting or base for the generator casing hereafter described and which is mounted on and affixed to the top side of the conveyor casing 6. The conveyor casing 6 is open at its upper side but covered as hereafter described by the generator casing.

The conveyor casing 6 has formed in its sides 6a and 6b bearings in which are revolvably mounted a pair of rotatable shafts 16 and 17, one being mounted to revolve on a horizontal axis at the left hand end of the conveyor casing, Fig. 1, in the approximate axis of the form of part 1a, and the other being mounted to revolve on a horizontal axis to revolve approximately in the axis of the form of part 1b, the axes of the two shafts being parallel to each other, and revolving in a horizontal plane, approximately as many feet apart as the distance from the axis of the part 1a to the axis of the part 1b, and this may be twenty or more feet in distance in an average or comparatively small size plant, or it may be much more in a very large plant.

The shafts 16 and 17 have fixed to revolve with them sprocket wheels 18, at one end, and 19 at the other end, these sprocket wheels being similar to such sprocket wheels as are generally used to mount chain conveyors or chain grate conveyors of a belt type, continuously revolving. The sprocket wheels 18, 19 are fixed on their shafts just inside of the side wall 6a or 6b at their location, there being two on each shaft, one at each end of the shaft, just inside the wall of the conveyor casing 6. There is mounted on the sprocket wheels 18, 19, a belt type chain conveyor, which may generally be called a belt conveyor or belt grate, and which is generally of the type of chain grates, having chain or grate slabs 20, each approximately as long as the distance from the interior side of a side wall 6a to the interior side of the opposite side wall 6b, and placed to extend from the one wall 6a to the other wall 6b, inside the conveyor casing. Each conveyor or grate slab 20 may be several inches in width, this depending on the relative size of the device, and the quantity of material to be moved, and each slab 20 has a right angled ledge or flange 21 extending away from its surface nearest the central plane of the revolution of the belt conveyor or belt grate. The flange 21 of each slab 20 is formed integrally with it, and thus each slab is substantially an angle piece or slab of steel but should be made of a steel alloy which will withstand high temperature.

The flanges 21 of the slabs 20 are each exactly equal in height from the level of the slab 20, and each slab has at each end the construction shown in Figures 5 and 6. Each slab will thus have at each end at one edge or side the tongue 22 and at the opposite side the bifurcated or split part 23, and will also have immediately inside, that is below the extreme end of the slab, the tooth 24 which is a tooth for cooperation with the teeth of the sprocket wheel 18 or 19 in operation. The teeth 24 are so placed in the slabs, with respect to the flexing of the chain grate in movement, that the front or leading edge of the slab 20 in movement will be held relatively close to the adjacent surface of the conveyor table 1 and its parts 1a and 1b in movement curving around the ends of the table.

The slabs 20 are joined together to form a belt grate or chain grate of an endless or continuous type around the conveyor table 1 and its two end parts 1a and 1b, each slab 20 at its ends being connected to the next slab flexibly by means of pins or bolts 25 placed in holes in the parts 22 and 23 adjacent, in such manner that there will be free pivoting of the slabs relatively to each other upon their pivot pins or bolts 25 in movement.

The belt conveyor as thus formed encircles the conveyor table 1 and its parts 1a and 1b, and constitutes a level or table like long section passing over the top of conveyor table 1 and lying on or very close to the top surface of the table 1, and constitutes on the under side of table 1, a level or flat long section passing under an open or uncovered space 26 under conveyor table 1, between the parts 1a and 1b so that when passing under this space the slabs 20 will by the narrow crevices between slabs, permit slight or a small movement of air upwardly into the space 26 at one end, from beneath, this air movement passing air to the small ports 4 by which this portion of the air supply may pass in small volume between the slabs passing around outward side of part 1b into the space between the conveyor table part 1b and the conveyor casing wall at that end, thus providing for some cooling effect of air on the under side of table 1 and interiorly of part 1b.

The belt conveyor described will at its left end move in the curved space 27 between part 1a and the curved part 28 of the conveyor casing 6, and then in the space just beneath shoe 7 and between the latter's under surface and the top of conveyor table 1 at this location, and the slabs 20 with their flanges 21 will in that movement between curved part 28 and shoe 7 and the conveyor table part 1a and the adjacent short section of table 1, just have space for passage freely without friction or undue friction against the inside wall of part 28 and the underside of shoe 7, so that flanges 21 will perform their shaving or cutting feed operation, as hereafter described. At the opposite end of table 1, however, the slabs 20 with flanges 21 will move around part 1b with more than sufficient space for flanges 21, so that there will be not only space for flanges 21 of slabs 20 but also a sufficient space outside of flanges 21 between them and the curved adjacent wall 14 of the conveyor casing for a voluminous and sufficient passage of air from the air blower, as hereafter described (or as created by natural draft) to provide sufficient air for combustion, it being contemplated that combustion will be supported in the major part by the passage of air around the outer side of flanges 21 between them and part 14 of casing 6. The space between flanges 21 and part 14 may be denoted 13 and will provide space not only for air passage but for ashes dropping downwardly or falling from the grate in passage around part 1b.

There is mounted over the conveyor casing thus formed and above the conveyor grate as described, an upper section or so-called generator section, which has a steam generator casing 31 formed of steel, and which has around its lower outside edge a flange 32 which in mounting rests on the flange 15 of the conveyor casing 6, whereby the generator section is thus supported on flanges 15 and over the conveyor casing, to completely cover the open upper side of the conveyor casing and so that thus the top section of the belt conveyor will be enclosed between the table 1 of casing 6 and this generator section.

The generator section has in addition to steam generator casing 31, an arched furnace wall 33 at the right hand end, Fig. 1, and a header chamber 34 at the opposite or left end, and just to the left of header chamber 34, a discharge flue 35, and just to the left of discharge flue 35 a sludge or material hopper 36, and has also a short distance leftwardly of the furnace wall 33, say approximately one-third to one-fourth of the distance from end to end (or even less), a divider or division wall 37, and a few inches leftwardly of the divider wall 37, a flue wall or header wall 38. These parts of the generator section generally divide the generator section into furnace chamber F, gas collector chamber 39, steam generator chamber 40, header chamber 34, discharge flue 35, and sludge or material hopper 36. The gas collector chamber 39 is at its lower or bottom side open by means of a long narrow port 41, transversely of the device, to the upper side of conveyor casing 6, that is to space immediately above the belt conveyor at this location. The port 41 is approximately as long, transversely of the conveyor casing as the latter is wide interiorly.

The steam generator chamber 40 has in its upper portion flues 42 placed in three tiers, as shown, between the wall 43 at left hand end of steam generator chamber 40 and the wall 44 at the right hand end, the latter wall separating the steam generator chamber 40 from furnace chamber F, at this location, the divider wall 37, therebelow separating the furnace chamber F from the gas collector chamber 39. The flues 42 are at each end of each, welded firmly into the wall 43 or 44. The steam generator chamber 40 has in its lower portion flues 45 placed in three tiers (below tubes or flues 42) the flues 45 being at one end welded firmly into wall 43 and being at their opposite ends firmly welded into the header wall 38, so that these flues 45 thus form connection by means of the bores of the flues between the header chamber 34 at the left hand, and the gas collector chamber 39 at the right hand end, the flow being always towards the right in Fig. 1, through flues 45. The flow through flues 42 is on the other hand always towards the left, in Fig. 1, that is from furnace chamber F to the header chamber 34, where the gases will flow downwardly to the left hand ends of flues 45. The lower wall 31a of the steam generator casing forms a cover for the portion of the upper space of conveyor casing 6 above conveyor table 1 and its conveyor chain grate, in the section beneath this lower wall 31a, but the latter does not extend to close port 41 which is always an open port from gas collector chamber 39 to the space above the belt conveyor or grate, immediately to the right of the lower wall 31a, which would be the space immediately to the left of the divider wall 37, the latter effectively dividing the space above the grate into two sections, one that beneath the furnace chamber F and the other that beneath the wall 31a and port 41 and its gas collector chamber 39.

The divider wall 37 at its lower end forms a shoe 37a which extends entirely across the space above the table 1 and its conveyor grate, and this shoe 37a with divider wall 37 divides the furnace chamber F from gas collector chamber 39 so that there is no means of passage of gases of combustion from furnace chamber F to gas collector chamber 39 except by way of, first flues 42 and then flues 45, in succession until the gases reach gas collector chamber 39. The lower face of shoe 37a is flat throughout most of its width in direction of movement of the belt conveyor and of a length on this under surface sufficient so that at all times there will be at least two and preferably three of the flanges 21 of slabs 20 included beneath that surface in the movement of the belt conveyor rightwardly (Fig. 1) under shoe 37a, so that thus the flanges 21 will prevent any passage of gases under divider wall 37 at any time, but will still permit passage of sludge material included in the space over slabs 20 between the flanges 21 passing under divider wall 37.

The divider wall 37 while extending entirely from one side wall to the other of the generator section, so as to completely form the division indicated, has formed interiorly of it a completely enclosed chamber 46 which is an air cooling chamber for the divider wall 37, and this chamber at its lower portion has small air outlets or apertures 47 delivering to the adjacent side of the furnace chamber F and has delivery to it from air pipe 48, the latter receiving air blown from air blower 49, to the extent permitted by hand valve 50, the latter being provided so that there may be some degree of proportioning of the flow of the air blown by blower 49, as some of the air blown by the latter passes, and this is the major portion, by way of conduit 51 to the air port or channel 9, the hand valve 52 providing for some restriction of this passage, or a complete restriction when the draft door is opened as hereafter described. Always the valve 50 should permit some small amount of air to pass to air cooling chamber 46 for cooling of the divider wall 37. It is to be noted here, however, that the divider wall 37 may be formed instead of a refractory fire brick or any refractory material which will permit of construction as a divider wall and be supported substantially in the position shown to perform the division function shown.

The furnace chamber F has a port 53 with a removable cover 54 thereon, which will provide access to furnace chamber F for lighting or starting ignition and observation of the combustion, although this port must always normally be covered. Furnace chamber F has delivering to it a gas nozzle 55 delivering from main 56, as controlled by hand valve 57, this gas delivery to furnace chamber F being provided for use of illuminating or natural gas for starting of combustion or for use in limited extent for providing combustion in furnace chamber F whenever that may be necessary. This fuel supply is a supplemental supply and may be eliminated as hereafter described, when other supplemental fuel is used, if necessary.

On the upper side of steam generator chamber or casing 31 there is a dome 58 and a steam conduit 59 delivering therefrom, a hand valve 60 being interposed in conduit 59, thereby providing means for delivery of steam from steam generator chamber 40 to any device for utilizing steam for motive power, or for steam heating, or for heating of digester tanks or other apparatus as may be used in a plant. It will be noted here that this steam conduit 59 will preferably deliver to a main conduit to which other such devices as this described will be connected to deliver, so that there will be supply to such a main conduit from any of a number of units such as this described, and so that the delivery from either unit, as this, may be in proportion to the temperature control as hereafter described of the unit, that is in proportion to the combustion and the heat transfer from the combustion gases.

The steam generator chamber 40 has delivering to it near its bottom, a water conduit 61 which will deliver water as pumped by a pump 62 having pump plunger 63 driven by crank 64, the latter driven through mitre gears 65, 66, by means of electric motor 67, at a reduced speed, the pump receiving water from a water main 68, as pumped. The electric motor 67 is connected to receive current from battery 69 whenever a thermostatic two element control means 70 in gas collector chamber 39, is so heated that contact is made between the contacts 71 and 72 (Fig. 4) the latter contacts being mounted on leaf springs 73, 74, a stop 75 preventing contact when the thermostatic element registers a temperature below the temperature at which contact is made. Thus the thermostatic control 70 will cause passage of electric current to motor 67 whenever the temperature in gas collector chamber 39 exceeds the predetermined maximum temperature to be permitted in chamber 39, whatever that may be, and thus steam generation in the steam generator chamber 40 is somewhat in proportion to the temperature in the gas collector chamber 39. In this connection it should be noted that in operation the hand valve 60 will always be at least partially open, and that a safety steam exhaust valve means 76 yieldably closed by spring 77 will permit exhaust under greatly excessive pressure. Normally steam pressures will automatically be kept below the blow-off pressure of the safety valve 76, since the generator steam may always exhaust through main or conduit 59. Automatic means for controlling delivery of steam may be used as is shown in connection with another form hereafter described.

The discharge flue 35 receives combustion gases from the left hand end (Fig. 1) of the space between the belt conveyor, on top of table 1, and the lower wall 31a, of the steam generator casing 31, through a narrow but long passage or port 78 extending from one side of the generator casing to the other, this passage 78 having its opening just immediately above the right hand end of shoe 7, and passing gases over the upper side of shoe 7 to discharge flue 35. The latter discharges by means of pipe 79 to smoke stack 80.

The sludge or material hopper 36 is open at its lower end to the sludge port or channel 8, so that sludge or combustible material may flow downwardly under weight of its material through channel 8 to the spaces between flanges 21 of slabs 20 when the slabs 20 pass in succession under the shoe 7. The hopper 36 must in any case be high enough to provide a sufficient weight of material within it, and it should normally be kept as nearly full as possible to provide the adequate weight of material.

The lower wall of conveyor casing 6, underneath the belt conveyor, near the left hand end, has a transverse port opening 81, covered by draft door 82 hinged at 83 and bolted in place at the other end by bolt 84, so that this draft door may be closed in starting and may when draft from smoke stack 80 becomes adequate for natural draft be opened to permit of atmospheric air passing through port 81 to the space beneath belt conveyor section on the underside of table 1.

One of the shafts 16, 17 (as shown that at the right hand end), has on its extreme end outside of conveyor casing 6, firmly secured thereto a large pulley 85, and the latter is by belt 86 driven by the small pulley 87 on the shaft of an electric motor 88, the latter being of a variable speed type, so that its speed may be regulated to provide a speed of the belt conveyor around table 1, adequate for the service designed, while not excessive to provide adequate combustion. The speed of the belt conveyor may be varied by regulating the speed of the electric motor 88.

The air blower 49 is driven by another variable speed electric motor 89, thus providing means whereby the speed of the air blower 49 may be varied as may be found necessary to provide an adequate flow of air for combustion, especially in the heating process and preconditioning. The air blower 49 is intended to provide atmospheric air from air induction means 90 of air blower 49, and to deliver the air at a pressure just sufficiently above atmosphere to cause a movement of air into conveyor casing 6 beneath table 1 and around the end 1b into furnace chamber F simulating that caused by a natural draft in ordinary furnaces, and not a greater or excessive pressure, so that there will be especially in preheating sufficient draft for combustion. It is to be noted that in normal operation the air blower 49 may provide only sufficient air for cooling the divider wall 37, the bulk of the combustion air being then drawn by natural draft from the draft port 81 into conveyor casing 6 and around part 1b into furnace chamber F, the draft door 82 being then opened to provide this access of atmospheric air freely as induced by natural draft by the ascending combustion gases in smoke stack 80.

The space H which is between the tops of the flanges 21 of slabs 20 and the underside of the wall 31a on the underside of the steam generator casing 31 is sufficiently long so as to permit of the hot combustion products performing the drying function, as hereafter described, the slowness of movement rightwardly of the top tier of the conveyor slabs 20 contributing to this function. This space at its extreme right, that is just below port 41, receives combustion gases as they emerge through port 41 from gas collector chamber 39, and this space after conducting the combustion gases along the top surface of the sludge material disposed on the top side of slabs 20 between flanges 21, discharges the combustion gases which have parted with some of their heat, to the smoke discharge flue 35.

Having described in detail the various elements or means composing our apparatus, there is now described, in general the use and operation of the apparatus, and process. The air blower 49 may be driven by its electric motor to provide a slow flow of air to furnace chamber F. Now illuminating or natural gas may be caused to flow by the gas main 56 to gas nozzle 55 and ignited by any means through the opening provided in furnace chamber F by removing its cover temporarily. This gas may then burn and be used in sufficient volume for heating, or it may be used only in sufficient volume for igniting a supply of coal screenings which may be used for initial heating. Such coal screenings may be placed in hopper 36 in sufficient amount for initial heating of the device, and will as it reaches the furnace chamber F be ignited by the burning gas or by any means. The electric motor 88 driving the belt conveyor is given sufficient current to drive it at a slow speed. Thereupon the preparatory charge of coal screenings will burn for the initial heating or warm up period to heat the interior of the device to a proper operating temperature for the sludge drying, and this temperature may be determined as that temperature which would result from a temperature in the water included in the steam generator chamber 40, of say something between 600 degrees Fahrenheit and 900 degrees Fahrenheit. It is of course understood that during this heating period the hand valve 60 must be closed to permit pressure to accumulate within the generator chamber 40 to a sufficiently high pressure so that the operating temperature will be reached or attained. The hand switch S controlling the circuit through motor 67 and contacts 71—72 will be closed for a few moments until sufficient water has been introduced to about one half fill the steam generator chamber 40, and the hand switch S may then be opened until the operating temperature has been attained. Hand switch S will under normal operation be open continuously.

After a sufficient quantity of coal screenings have been placed in hopper 36 for the initial heating, there is then placed in hopper 36 either the sludge material or a mixture of the sludge material and a small percentage by weight of coal screenings, and the hopper is then fed continuously by any means as may be provided.

The hopper being now full of sludge material entering therein on top of the supply of coal screenings for initial heating, the motor 88 driving the pulley 85 of the belt conveyor comprised of slabs 20 is then regulated as to its speed so as to procure a speed of revolution of pulley 85 and the belt conveyor, which may be determined to be a proper belt conveyor speed for the particular installation, and this speed should be such a speed as will cause the conveyor slabs 20 to move at a relatively slow rate of speed, say only a few inches per minute as they travel rightwardly along the upper surface of the conveyor table 1, but this speed will be such as is determined in practice or experiment, to be the best or most efficient operating speed for the belt conveyor of any particular installation. This speed will depend on several factors, one of which is the length of the drying space leftwardly of the divider wall 37 and the length of the space rightwardly of divider wall 37 in furnace chamber F, one of which is the temperature which is determined to be the best operating temperature of the combustion gases entering gas collector chamber 39, and another of which is the percentage by weight of moisture in the sludge or other material to be dried and combusted, and another of which is the ratio of thickness of the sludge material carried along by the conveyor slabs 20, and the latter is determined by the relative height of flanges 21 of slabs 20. Preferably that height would be approximately two inches more or less, and this height would limit the thickness of the sludge material to two inches as it is carried over the slabs 20 over the conveyor table 1 to furnace chamber F. (In the event the device is used for garbage combustion this thickness would preferably be greater.)

The sludge material contemplated to be fed to hopper 36 is contemplated to be the sludge material or sewage sludge produced by any operation or process in a sewage disposal plant.

Having filled hopper 36, and maintaining hopper 36 nearly full, the weight of material will cause a steady flow, even though sluggish flow, downwardly to channel port 8 and at the bottom of this port 8, the flanges 21 will slowly move rightwardly across the mouth of the port, and as they so move, they will cut or shave a two inch (more or less) thickness of sludge material from the port as the sludge material moves downwardly on slabs 20, and each slab 20 will then carry its two inch (more or less) layer of sludge material on it, rightwardly, and this thickness is limited and prescribed by the shoe 7 immediately above the flanges 21 as they move away, and thus the material will be carried as a two inch layer of material as wide as the slabs 20 are long which may in any particular installation be as much as five to ten feet or more, depending on the other comparative measurements in the device, and this material slab two inches thick, as many feet wide as the slabs are long, broken only by the thin flanges 21, will move rightwardly along with slabs over top of conveyor table 1, passing rightwardly (Fig. 1) under wall 31a, leaving a space of say several inches thick or high, through which combustion gases are flowing leftwardly, and the material slab will then pass under the lower face of shoe 37a of divider wall 37 into the furnace chamber F entering therein at the left side thereof, and as the material so enters it will encounter the high temperature and heat of the furnace chamber and combustion will then immediately occur. It is contemplated the temperature of the combustion gases from collector chamber 39 will not be so high as to ignite the material before the divider wall 37 is reached and passed.

The air for combustion is received either from air blower 49 or from draft opening 81 if draft door 82 is opened, and this air passes principally along the underside of the leftwardly moving lower section of the belt conveyor, and so moving along the underside thereof cools the belt conveyor somewhat, and as it passes towards the right end of table 1, passes over the ash pit gathering some heat therefrom, then passes around the right hand end of the conveyor table and conveyor slabs 20 at that end or passing that end, and upwardly through space 13 passing counterwisely of the falling ashes in that space, thereby absorbing some heat from those ashes, and cooling those ashes somewhat, and as so heated passes into the right hand side of furnace chamber F where the air supplies the combustion with oxygen therefor. A small or minor portion of the air current passes between slabs 20 passing underneath table 1 and into space 26 between the lower section of slabs 20 and table 1, above, and thereby towards right hand of that space, and from that space through ports 4 into the major air stream again. The gases of combustion in furnace chamber F pass upwardly and into the right hand end (Fig. 1) of the flues 42, the current of combustion gases then passing in divided small streams through flues 42 to the left hand end thereof and into header chamber 34, from which the gases will enter the left hand ends of flues 45, then passing rightwardly and out from the right hand ends of flues 45 to the gas collector chamber 39, from which the gases will pass in a thin sheet transversely of the belt conveyor downwardly out of port 41 to the space immediately leftwardly of divider wall 37 and above the upper rightwardly moving tier of slabs 20, then passing leftwardly along the rightwardly moving sludge material, heating the latter, and after such heating of the sludge material, the gases pass over the upper face of shoe 7 into discharge flue 35, and thereby to smoke stack 80.

As the gases of combustion in furnace chamber F enter flues 42 they are at their maximum temperature, which may be considerably over 1200 degrees Fahrenheit, and may be as much as 2000 degrees Fahrenheit or even more depending somewhat on the percentage of combustible material in the solids of the sludge material. As the gases are at so high a temperature as they enter flues 42, they may as they pass first through flues 42 and then through flues 45, give up considerable of their heat and still remain at a rather high temperature as they leave flues 45 and enter gas collector chamber 39. The thermostatic temperature control 70 is located in the latter chamber and thereby is maintained at a temperature approximately that of the gases passing into chamber 39 from flues 45. Thus this control 70 will quickly reflect the changes of temperature of gases leaving flues 45 and entering chamber 39 and if this control 70 is set or so regulated as to reflect the temperature determined as the most effective temperature of gases leaving chamber 39 to pass leftwardly over the moving sludge material on slabs 20, in space H, this temperature will be closely attained by this control through its effect on the water delivery to steam generator chamber 40. As soon as this temperature exceeds the predetermined temperature, for control, the contacts 71—72 will be closed and thereby (the hand switch S must now be open) current will flow through the electric motor driving the water pump and water will then flow into steam generator chamber 40 so that the temperature of water in the lower part of chamber 40 is then quickly lowered to a degree sufficient to lower the temperature of gases entering chamber 39. Conversely if the gases are at a temperature less than the predetermined control temperature, the contacts 71—72 will break contact and current flow will then cease and the pumping of water into chamber 40 will cease until the temperature again reaches the maximum allowable temperature in chamber 39 by control 70. It should be noted that now in normal operation the hand valve 60 permitting steam flow from the generator chamber 40 is open, and steam will continuously flow into the conduit 59 to supply the steam main or whatever power or heating means is supplied, and thus steam flow from the generator chamber will be such as to cause absorption of heat in proportion to the temperature of the combustion gases and in proportion to the quantity of water supplied to the generator chamber 40.

The greater the quantity of unheated water in chamber 40, the greater will be the proportionate heat absorption from gases passing through flues 42 and 45, and the less that quantity the less will be the relative absorption of heat from the said gases, so that thereby the control 70, acting to increase or diminish the water supply will tend to increase or diminish the heat absorption from the combustion gases by the steam generator chamber 40, and so that thereby the result will be a maintenance of the temperature of gases entering gas collector chamber 39 from flues 45 at a fairly close approximation to the temperature determined by the control 70. Thus gases entering the space H above the rightwardly moving sludge material, will be maintained at approximately that temperature best contributing to the drying of the sludge material without combustion thereof until such material reaches the right hand side of divider wall 37.

It is considered that a temperature of something approaching seven or eight hundred degrees Fahrenheit, and not less than 400 degrees Fahrenheit will best contribute to the evaporation of the moisture content of the sludge material (or garbage material) but that best temperature will be best determined for any particular installation by experiment and in accordance with or as determined by the conditions or characteristics of the particular type of sludge material to be dried and consumed. It will also be determined partly by the considerations effecting proximity of dwellings or habitations to the disposal plant.

It is also a consideration in securing of proper temperatures for drying and combustion, that the various elements, as the furnace chamber F, the flues 42, the flues 45, the space H, the length of the drying space H, be so proportioned as to achieve the particular ends or purposes especially sought in the particular installation. The proportioning should be such as to secure (in cooperation with the indicated temperature control) a sufficient drying action, while not attaining a too great drying action and temperature prior to the actual combustion in furnace chamber F. The proportioning is best determined by experiment for any installation. At any time in operation, some or a small proportion of heat may be supplied by combustion of natural gas from the gas nozzle, if delivery of gas be permitted. In passing over the conveyor table to furnace chamber F, the sludge material should have most of its moisture removed by the evaporation of the water content, and the material should not be so excessively dried as to be reduced to a dust, as this would permit passing of dust with the combustion gases, so that accordingly the control by the temperature control means 70, is important to maintain the drying effect while not permitting excessive drying effect.

In the form described, the gases of combustion will have a sufficient temperature as they leave chamber 39, something over 400 degrees and in some constructions as much as near 800 degrees Fahrenheit, so that the temperature of evaporation of water content is attained in the sludge material as it is passed, and thus, as the sludge material is disposed in a rather thin sheet of material and moves slowly, water content will be quite thoroughly evaporated, while not completely evaporated, and this water vapor will be caught by the passing gases and pass with the gases to the smoke stack and to atmosphere without passing through furnace chamber F, and accordingly the sludge solids, and the less easily vaporizable hydrocarbon compounds in the sludge material will not gasify and be carried out but will remain in the sludge material until it reaches furnace chamber F where such hydrocarbon compounds will gasify and contribute to the combustion and will also be so consumed that such hydrocarbons are not longer a source of contamination in the gases of combustion issuing from the smoke stack.

For additional control and adjustment of the temperature of the gases leaving chamber 39, the hand valve 60, controlling the flow of steam from the steam generator chamber 40, may be used to control or vary the relative quantity of delivery from chamber 40 of steam to steam conduit 59, so, that thereby, the pressure of steam accumulation in the generator chamber 40 may be controlled to cause increase or decrease of that pressure. It is preferable that in installations the steam generation should be used to supply steam at high pressures such as are now commonly used in high pressure power devices, and that the pressure of such generation would then render necessary in the chamber 40 a high temperature of say over six hundred degrees Fahrenheit and at highest pressures near nine hundred degrees, so that in conjunction with such high pressures, the automatic water delivery control will automatically serve to maintain temperature of the gases of combustion delivered from chamber 39 for the drying or water evaporation effect at a temperature approaching eight or nine hundred degrees Fahrenheit if that be found necessary in any particular installation. In some installations where high temperatures are not found necessary the control may be such as to maintain a temperature of near four hundred degrees, as sufficient for a sufficient evaporation of the water content of the sludge material.

Referring now to the form shown in Figures 7, 8, 9, 10, this form is in general similar to the first form described, but shows an embodiment of the device in a means utilizing a multiple number of the belt conveyors and a separation of the drying function from the combustion function in a somewhat different manner than as shown in the first form, and shows also a somewhat modified placing of the steam generation means, while it yet performs the same function, and in addition shows a modified form of the temperature control means. In the illustration, Fig. 7, the left hand conveyor means comprises the conveyor table 1 which in this form also includes a flat bottom member 1d attached to the table 1 with the rounded ends 1a and 1b, and the conveyor slabs 20 pass over table 1 as in the first form, and measure or shave off the sludge material from the hopper channel 8 and convey the material as in the first form, but at the end of the travel over the top of table 1 the material has only been dried and is at the right hand end of this conveyor, generally denoted A, permitted to drop over the end of the conveyor downwardly to the upper surface of the conveyor B located on a level somewhat below, and to the right of conveyor A, Fig. 8, so that the material will as it drops from conveyor A fall upon the left hand end of conveyor B, the latter having table B1, slabs B20, flanges B21, and parts for driving it as the conveyor A does.

There is near the left hand end of conveyor B but just rightwardly of the location where the sludge material drops, a division wall B37 which on its bottom side has a flat level or horizontal surface placed just sufficiently above the level of the tops of flanges B21 as they move rightwardly, so that these flanges B21 may move under member B37 with just sufficient clearance to pass, and carry along the sludge material between the flanges B21 on slabs B20, the sludge material being by slabs B20 carried under member B37 into the furnace chamber F, where the material, as dried, partially, encounters the combustion in chamber F and the air for combustion blown thereto by air blower B49 or induced to flow thereto by the draft from the smoke stack 80. The air received under conveyor B flows rightwardly under conveyor B until the ash pit 10 is reached where the air flows under a dividing wall 91 over the surface of hot ashes in the ash pit and flows upwardly on the opposite side of wall 91 through space B13 to furnace chamber F to support combustion, and the combustion gases from chamber F flow upwardly through flues B42 to header chamber B34 to the upper ends of flues B45, and through the latter downwardly to gas collector chamber B39 and through port B41 to the space H over the conveyor A where the gases with their residual heat, heat the sludge material moving rightwardly on conveyor slabs A20 and vaporize a major portion of the water content of the sludge material, and the gases then carrying such water vapor therewith pass over shoe 7 into gas discharge flue B35 to pipe 79 and thereby to smoke stack 80.

The A conveyor is driven by a motor A88 and pulley A85 and the B conveyor is driven by another motor B88 and pulley B85, and each is thus separately driven by its associated electric motor, and each of the latter is a variable speed motor so that the speeds of each conveyor A and B may be separately varied according to the need therefor. The ash pit in this form may be dumped of ashes through either of the two ports 92 and 93 in lower wall of the ash pit into a pair of ash chambers 94 and 95, each of which has ash removal doors or covers 96—97, and the ports 92, 93 are independently closed by slide doors 98 and 99, thereby providing for such continuous removal of ashes as may be necessary without interference with the draft, which should be maintained in its normal condition during ash removal.

A modified automatic control for the water delivery to the steam generation is provided in this form, and this consists of the water pump 62 driven by electric motor 67 and delivering water to the water preheating chamber 100 by conduit 101, and a control for the motor driving the pump, which control is in part thermostatic and in part determined by a float 102, the latter placed in the lower part of the steam generation chamber 40 and by lever 103 pivoted at 104, adapted to open or close contacts 105, 106, thereby closing or opening the circuit of battery 69 with motor 67. This circuit may however also be closed by a thermostatic two element control means 70 placed in gas collector chamber B39 and adapted to close contacts 71—72 together when temperature in the chamber B39 reaches the predetermined maximum temperature of gases leaving chamber B39, which maximum temperature may as in the first form be as much as say 800 degrees Fahrenheit or something below and near that temperature, such as may be found to be the most suitable temperature. Thus control 70 will close the circuit through motor 67 when the temperature in chamber B39 reaches the maximum temperature predetermined, or the circuit will be closed when the water level in the steam generator chamber 40 falls low enough to permit falling of float 102 to close contacts 105—106. Thus in this form of control, water is delivered whenever the water level in chamber 40 becomes dangerously low so there may not be steam generation to cool the flues sufficiently, and water may also be delivered whenever the temperature in chamber B39 exceeds the predetermined temperature of the gases issuing to space BH above the sludge. In this form, Fig. 7, there is also a modified steam discharging control consisting of a pressure controlled sleeve valve 107 yieldably pressed by spring 108, the valve always allowing small opening of discharge port 109 but on excessive pressure opening port 109 wider to permit discharge in greater volume to steam conduit 59. This discharge has also control by hand valve 60, and discharge is shown to be to a steam main 110 which may be a main receiving steam from several units such as this, and the main 110 delivers steam under pressure to one or more steam power turbines 111, for power generation.

Thus in this modified form, Figs. 7, 8, 9, 10, the temperature is subject to thermostatic control of the water delivery, float control of the water delivery, and pressure control of the steam discharge, and these controls result in a maintenance of temperature near the predetermined desired maximum of gases issuing from chamber B39 to the space BH over the moving sludge material, for drying of the latter by water evaporation. This condition will be obtained, since water will enter chamber 100 for heating when the temperature is too high, water will pass through conduit 112 from chamber 100 to chamber 40, water will not become too low because float 102 prohibits this, and pressure will be automatically maintained to maintain the pressure in chamber 40 requiring the required nearly maximum temperature of gases in chamber B39. In this form the division wall B37 constitutes a means, as does divider wall 37 in the first form described, for dividing the drying gases from the combustion in the furnace chamber F, thereby dividing the function of the conveying means into a drying division and a combustion division.

While we have shown particular devices and combinations of devices in the illustration of our device, we contemplate that other detailed devices and combinations of devices may be used in the realization of the invention, without departing from the spirit and intention thereof.

What we claim is:

1. An apparatus for combustion of sewage sludge or other moisture containing matter, comprising; an elongated horizontal conveyor casing including side and bottom members, a combustion furnace at one end of said conveyor casing and communicating therewith, a conveyor disposed within said conveyor casing with its receiving end located adjacent the end of said conveyor casing remote from said furnace and with its discharge end located within said furnace, means for feeding matter to the receiving end of said conveyor, means for introducing combustion air to material upon said conveyor within said furnace, a steam generator unit located on top of said conveyor casing, the bottom of said steam generator and the side and bottom walls of said conveyor casing forming a matter feeding channel through which matter introduced by said feeding means is adapted to be moved from said means into said furnace, said steam generator being provided with a flue for gases of combustion communicating at one end with said combustion furnace and at its other end with said channel, a feed controlling shoe extending transversely across the matter feeding channel adjacent the feeding means and on the side of said feeding means toward the combustion furnace, said shoe extending from the walls of said channel closely adjacent to the said conveyor to control the feed of matter from said feeding means into said channel, and to form with said conveyor a seal to prevent the escape of gases from said channel, a partitioning shoe extending across said matter feeding channel adjacent to said combustion furnace and extending from the walls of said channel to closely adjacent to said conveyor to prevent the passage of gases between said channel and said furnace, the communication of said flue with said channel being adjacent said partitioning shoe on the side of said partitioning shoe away from said furnace, and an outlet means for combustion gases in communication with said channel adjacent said feed controlling shoe.

2. An apparatus for combustion of sewage sludge or other moisture containing matter, comprising; an elongated horizontal conveyor casing including side and bottom members, a combustion furnace at one end of said conveyor casing and communicating therewith, and a conveyor disposed within said conveyor casing with its receiving end located adjacent the end of said conveyor casing remote from said furnace and with its discharge end located within said furnace, means for feeding matter to the receiving end of said conveyor, means for introducing combustion air to material upon said conveyor within said furnace, a steam generator unit located on top of said conveyor casing, the bottom of said steam generator and the side and bottom walls of said conveyor casing forming a matter feeding channel through which matter introduced by said feeding means is adapted to be moved from said means into said furnace, said steam generator being provided with a flue for gases of combustion communicating at one end with said combustion furnace, a feed controlling shoe extending transversely across the matter feeding channel adjacent the feeding means and on the side of said feeding means toward the combustion furnace, said shoe extending from the walls of said channel closely adjacent to the said conveyor to control the feed of matter from said feeding means into said channel, and to form with said conveyor a seal to prevent the escape of gases from said channel, a partitioning shoe extending across said matter feeding channel adjacent to said combustion furnace and extending from the walls of said channel to closely adjacent to said conveyor to prevent the passage of gases between said channel and said furnace, the said shoes forming a matter heating space therebetween within said channel, the said flue having communication with said matter heating space adjacent said partitioning shoe, and an outlet means for combustion gases in communication with said channel adjacent said feed controlling shoe.

ADOLPHE C. PETERSON.
CLIFFORD R. RAITER.